Figure 1:
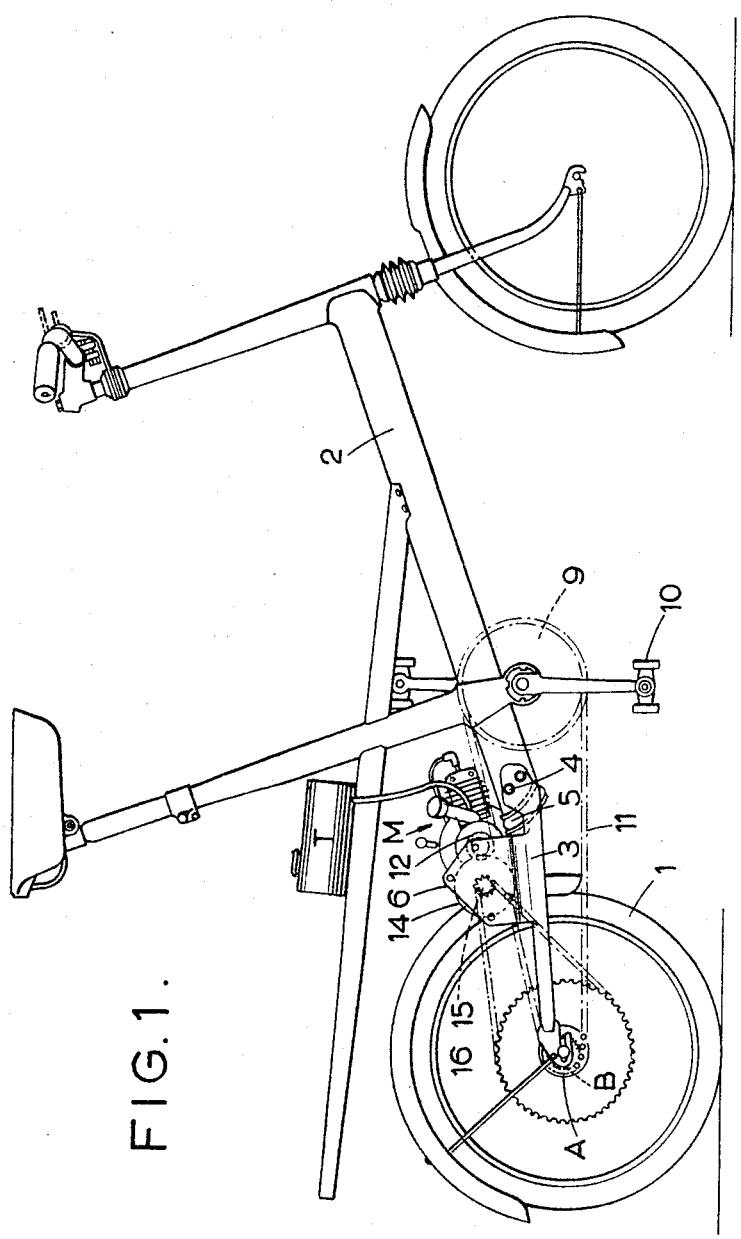

Oct. 25, 1966    A. E. MOULTON    3,280,932
POWER-ASSISTED BICYCLE
Filed March 18, 1965    3 Sheets-Sheet 1

INVENTOR
ALEXANDER ERIC MOULTON
BY
Shoemaker and Mattare
ATTORNEYS

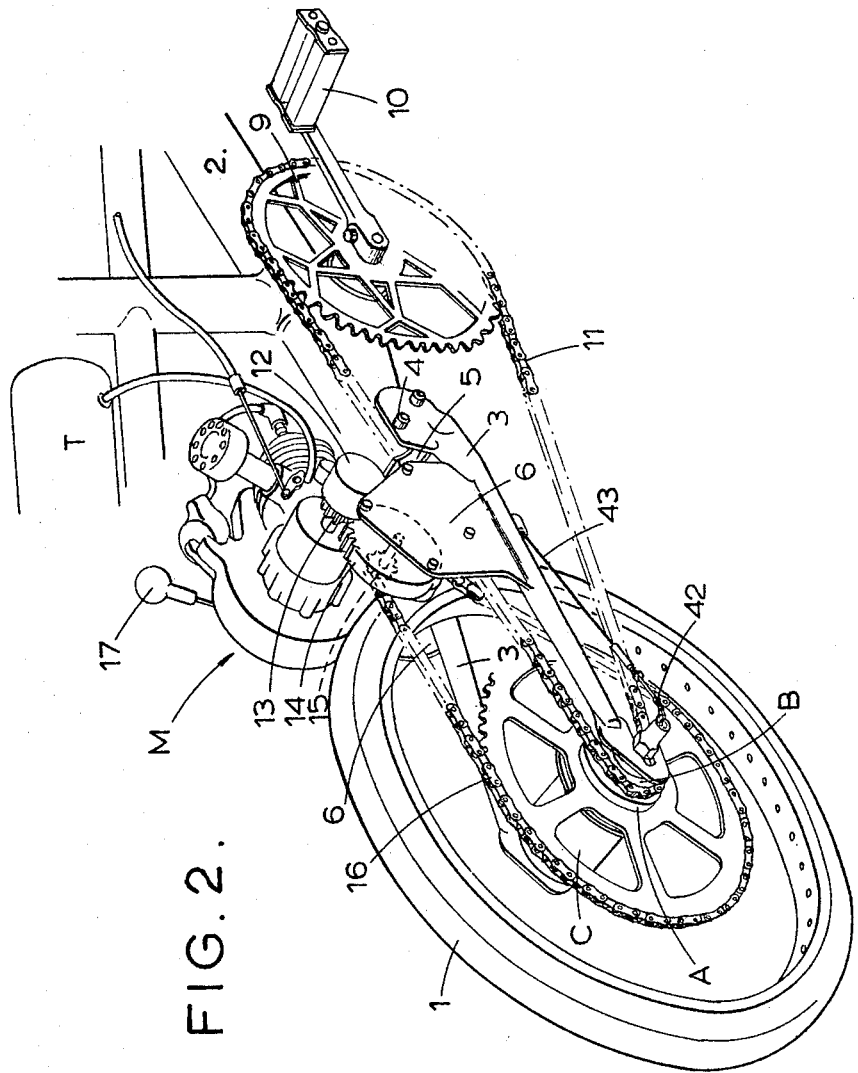

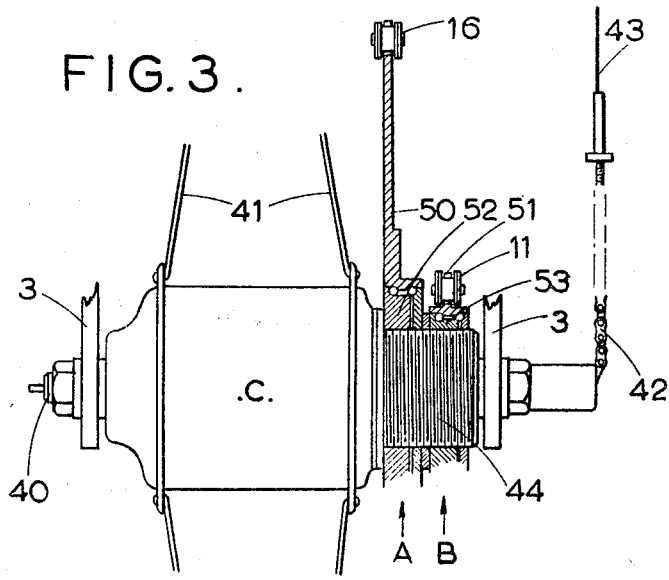
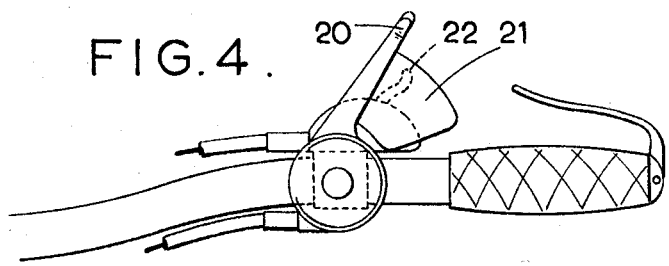
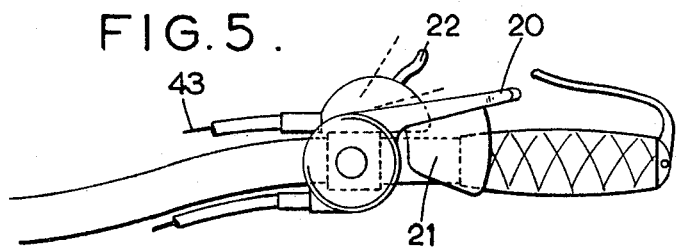

United States Patent Office 3,280,932
Patented Oct. 25, 1966

3,280,932
POWER-ASSISTED BICYCLE
Alexander Eric Moulton, Bradford-on-Avon, England, assignor to Moulton Consultants Limited, Bradford-on-Avon, England, a British company
Filed Mar. 18, 1965, Ser. No. 440,833
Claims priority, application Great Britain, Mar. 26, 1964, 12,849/64
6 Claims. (Cl. 180—32)

This invention is concerned with providing power assisted drive means for two-wheeled pedal cycle vehicles (hereinafter referred to as bicycles). The invention is moreover limited to those bicycles having pedal driven rear wheels of an overall diameter of less than 20 inches, which driven rear wheels are provided at their hubs with gear boxes of the conventional per se known kind provided on bicycles. These gear boxes are disposed at the rear wheel hub and provide two or more speed ratios which may be selected by means including a cable control, and such gear boxes are provided with an input drive sleeve on which is mounted a drive sprocket, which in turn is driven by a chain from a pedal chain wheel actuated by the rider.

In such hub gear boxes it is well known that the drive sprocket may be connected to the input sleeve through the medium of a unidirectional clutch device, commonly known as a free wheel, which operates in such manner that the sprocket and the input sleeve are only coupled in driving engagement in one direction of rotation, one relative to the other; the two members being free to rotate relative to one another in the opposite direction of roation. It is also known to provide one or more free-wheel devices on the drive output side of the gear box, operating that is, between the gear box and the wheel.

According to the present invention there is provided a pedal driven bicycle with a rear driven wheel of less than 20 inches in overall diameter and having a two or more speed gear box associated with the hub of said rear driven wheel and said hub gear box having an input drive sleeve on which is mounted a unidirectional drive or free-wheel sprocket through which drive is transmitted to said input sleeve from a pedal actuated chain wheel, which is characterised in that there is provided in addition, a second unidirectional or free-wheel sprocket mounted on said input sleeve in unidirectional driving engagement therewith, said second sprocket being driven by a second chain actuated by an internal combustion motor or other power drive means.

The pedal driven free-wheel sprocket and the motor driven free-wheel sprocket may be located side by side on a portion of the input sleeve of the hub gear box which portion extends axially on one side only of the wheel. Alternatively in cases where the input drive sleeve extends axially in opposite sides of the wheel the pedal driven free-wheel sprocket may be mounted on one side while the power driven sprocket may be mounted on the opposite side of the wheel. The power unit is preferably an internal combustion engine of small capacity and is mounted on the unsprung structure of the bicycle. Where the rear wheel of the bicycle is supported with respect to the frame of the bicycle by means of a spring controlled pivotally mounted arm structure the engine will be rigidly fixed to the arm structure so that the engine will move with the arm and thus the chain which transmits power from the engine to the power driven sprocket at the hub will not be subjected to variation of the length of its driving run.

The invention is limited to rear driven wheels of less than 20 inches overall tyred diameter since with such small wheels equipped with a hub mounted gear box it is a characteristic that, for a given gear ratio and road speed, while the revolutions of the wheel are increased, driving torque at the hub gear box is reduced, as compared with the hub gear box of a driven wheel of a larger diameter. When considering the provision of auxiliary motorised power means arranged to transmit power through a conventional hub gear box of a bicycle, it will be seen that the risk of overloading the gear box will be less with smaller as opposed to a conventionally sized wheel of 22–30 inches overall tyred diameter. When motorised power is transmitted to a wheel of small diameter through a hub gear box it has been found that the gear box operates satisfactorily and for long periods because it functions at higher revolutions but at lower torque for a given gear ratio and road speed than if it were fitted to a larger wheel.

According to a preferred embodiment of the invention an internal combustion engine is connected to drive the rear wheel of the bicycle through the medium of a centrifugal clutch by means of which drive is only transmitted when engine revolutions have reached a predetermined level, say 2000 r.p.m.; below this level drive is not transmitted. The engine must be capable of being started independently of its transmission system by, for example, a cord and pulley system or by an electric starter. This is because, due to the second free-wheel device provided in the transmission system, drive from the wheel cannot be transmitted back to the engine when the bicycle is being driven only by its pedals. When a small capacity internal combustion engine is employed, for example, a two stroke unit of under 50 cc. capacity, it will have fitted to it a governor device which is arranged to limit its maximum speed and thus prevent excessive engine speed.

One embodiment of the invention is described for example in the acompanying drawings in which:
FIGURE 1 is a side view of a bicycle equipped with auxiliary motorised drive means.
FIGURE 2 is a perspective view in greater detail of the transmission assembly.
FIGURE 3 is a sectional view of the rear driven hub.
FIGURES 4 and 5 illustrate an arrangement of handlebar mounted levers for controlling the engine and gear box of the bicycle shown in FIGURES 1 and 2.

The bicycle shown is of the open framed type described in the specification of United States Patent No. 3,083,039. It has front and rear wheels of 16 inches overall diameter.

Referring first to FIGURES 1 and 2, the rear wheel 1 is suspended on the frame 2 of the bicycle by trailing arms 3 pivotally mounted at 4. 5 is a rubber spring adapted resiliently to control the pivotal movement of the arms 3 relative to the frame, the system being, for example, as described in the specification of United States Patent No. 3,151,878.

Each trailing arm has welded to it a bracket 6. The two brackets 6 form with the arms 3 a composite structure capable of mounting a petrol driven motor generally designated M. The motor M is suitably a two stroke unit of up to 50 cc. capacity fed by tank T.

The motor M is equipped with a centrifugal clutch 12 or similar device through which power is only transmitted when the engine speed has been raised, by actuation of a throttle remotely controlled by the rider, to a predetermined level, say 2000 r.p.m. Above this level the clutch 12 transmits drive via reduction gears 13, 14, 15 and a chain 16 to a sprocket generally designated A equipped with a free-wheel device whereby the wheel is permitted to rotate at a greater speed than the sprocket A.

The motor is also equipped with means governing its maximum speed at a predetermined level at say 6000 r.p.m. and with means such as a pulley device 17 whereby it may be started, since, due to the presence of the free-wheel sprocket A, the motor cannot be started by rotating the wheel 1.

9 is a chain wheel transmitting drive from pedals 10, via a chain 11 to a conventional rear sprocket generally designated B equipped with a free-wheel device. C generally designates a conventional hub three or four speed gear box which may incorporate further free-wheel devices.

Referring now to FIGURE 3 the arms 3 mount a fixed spindle 40 about which the hub gear box C revolves, spokes 41 support the wheel on the hub C. A chain 42, which is connected by a cable 43 to a control 22 on the handlebars (FIGURE 5), forms part of the speed selection means for controlling the gear box C.

44 is an input drive sleeve for the gear box C and this sleeve 44 projects axially from the gear box on one side of the wheel.

The unidirectional drive or free-wheel sprocket B is fixed on the sleeve 44 and is driven by the chain 11.

Also fixed on the sleeve 44 is the second free-wheel sprocket A driven by the chain 16.

Both the free-wheel sprockets A and B are of known construction in that they have externally a toothed ring 50 and 51 engaged respectively by the chains 16 and 11. The toothed rings are supported on central bearing rings 52 and 53 by ball bearing assemblies. The rings 52 and 53 are fixed on the sleeve 44 and locked against rotation relative thereto. On the inside of each of the chain rings 50 and 51 is a ratchet, i.e. a series of teeth with long and short sides, while carried on each of the bearing rings 52 and 53 are a series of pawls which are spring loaded and bear outwardly into engagement with the ratchet teeth. When the rings 50 and 51 are revolved in one direction relative to the sleeve 44 the pawls will slide over the ratchet teeth and thus the rings 50 and 51 will be free of the wheel i.e. in the free-wheeling condition.

When, however, the ring 50 or the ring 51 is rotated in the opposite direction relative to the sleeve 44 the pawls will engage the ratchet teeth to lock with the sleeve 41 and by way of the gear box assembly C the rings 50 or 51 will be in driving engagement with the wheel.

The operation of the invention is as follows:

(a) Engine stopped. In this condition the bicycle may be driven through the pedals, changing gear in the normal fashion. Due to the presence of the free-wheel sprocket A, when the bicycle is so ridden no drive takes place through the chain 13. Thus, in this condition the only disadvantage experienced by the rider (as compared with a similar bicycle not equipped with a motor) is due to the weight of the motor M and the small degree of drag caused by the sprocket A free-wheeling. The centre of gravity of the motor is situated at or below the same level as that of the rider machine combination; balance is not therefore impaired.

(b) Engine running—throttle closed. In this condition engine speed will be insufficiently high to bring the centrifugal clutch 12 into drive-transmitting condition. In all other respects this condition is the same as (a) above.

(c) Engine running—throttle opened. As soon as engine speed rises sufficiently high the centrifugal clutch 12 will be brought into drive-transmitting condition. Drive is transmitted to the sprocket A and thence to the wheel 1 through the hub gear box C.

(d) Downhill or over-running. When road speed exceeds governed engine speed in any gear the sprocket A will free-wheel; where the hub gear box C is fitted with a free-wheel the latter may operate also.

(e) Pedal assistance. In either of conditions (c) or (d) above the pedals may be driven to assist the motor. If not sprocket B will free-wheel.

(f) Gear changing when engine driving. The throttle is closed so that condition (b) is adopted. A new gear is then selected and the throttle opened.

(g) Stopping or slowing down. The throttle is closed so that condition (b) is adopted and the vehicle behaves in all respects as a bicycle not equipped with a motor. The engine cannot be employed to assist braking since if the motor is stopped or its throttle is closed the sprocket A will free-wheel.

Referring now to FIGURES 4 and 5, 20 represents a throttle control lever which is provided with a shield 21 which when the throttle is opened (FIGURE 4) masks the gear change control lever 22. This arrangement is of advantage when a centrifugal clutch 12 is employed since when the throttle is closed engine revolutions will fall and the clutch 12 will operate to disconnect the drive between the motor M and chain 16. It is, of course, necessary to discontinue all drive to the gear box during gear changing.

However, instead of the centrifugal clutch 12 it is envisaged that a manually operated clutch could be employed to transmit drive from the motor to the reduction gears 13, 14 and 15. Such manually operated clutch would be controlled through a lever mounted on the handlebars in well known manner.

I claim:
1. A pedal driven bicycle with a rear driven wheel of less than 20 inches overall diameter and having a two or more speed gear box associated with the hub of the rear driven wheel and said hub gear box having an input drive sleeve on which is mounted a unidirectional drive or free-wheel sprocket through which drive is transmitted to said input sleeve from a pedal actuated chain wheel characterised in that there is provided in addition a second free-wheel sprocket mounted on said input sleeve and in unidirectional driving engagement therewith, said second sprocket being driven by a second chain actuated by an internal combustion motor or other power driven means.

2. A pedal bicycle according to claim 1, wherein the two free-wheel sprockets are mounted side by side on said input drive sleeve for the hub gear box, said sleeve projecting axially on one side of the wheel.

3. A pedal bicycle according to claim 1, wherein said input drive sleeve of the hub gear box projects axially on the opposite sides of the wheel and wherein one of said free-wheel sprockets is carried on a projecting portion of the sleeve on on side of the wheel while the second free-wheel sprocket is carried on the projecting portion of the sleeve on the opposite side of the wheel.

4. A pedal bicycle according to claim 1, wherein the rear driven wheel is supported with respect to the frame of the machine by means of a spring controlled pivotally mounted arm structure and wherein the internal combustion engine or other power driven means for driving by means of a chain the second free-wheel sprocket, is mounted on the arm structure.

5. A pedal bicycle according to claim 1, wherein the chain which drives the second free-wheel sprocket is driven from the internal combustion engine or other power drive means through a clutch device.

6. A pedal bicycle according to claim 5, wherein said clutch device is a centrifugal clutch.

References Cited by the Examiner
UNITED STATES PATENTS

| | | | |
|---|---|---|---|
| 899,746 | 9/1908 | Levedahl | 180—33 |
| 1,308,022 | 7/1919 | Christensen | 180—33 |
| 3,083,039 | 3/1963 | Moulton | 280—277 |
| 3,121,575 | 2/1964 | Bourgi | 280—236 |

FOREIGN PATENTS

| | | |
|---|---|---|
| 511,944 | 6/1952 | Belgium. |
| 1,132,461 | 6/1962 | Germany. |

KENNETH H. BETTS, *Primary Examiner.*